United States Patent
Sukegawa (10) Patent No.: US 8,386,694 B2
(45) Date of Patent: Feb. 26, 2013

(54) MEMORY DEVICE, ITS ACCESS METHOD, AND MEMORY SYSTEM

(75) Inventor: Hiroshi Sukegawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 441 days.

(21) Appl. No.: 11/565,276

(22) Filed: Nov. 30, 2006

(65) Prior Publication Data

US 2008/0028165 A1   Jan. 31, 2008

(30) Foreign Application Priority Data

Jul. 28, 2006   (JP) .................................. 2006-206615

(51) Int. Cl.
*G06F 12/02* (2006.01)

(52) U.S. Cl. ................ 711/103; 711/E12.002

(58) Field of Classification Search .................. None
See application file for complete search history.

(56) References Cited

U.S. PATENT DOCUMENTS

| | | | |
|---|---|---|---|
| 5,448,717 A * | 9/1995 | Balmer et al. ................ | 713/600 |
| 5,796,988 A * | 8/1998 | Naidu et al. ................... | 719/321 |
| 5,937,185 A * | 8/1999 | Weir et al. ....................... | 703/24 |
| 6,898,678 B1 * | 5/2005 | Six et al. ........................ | 711/151 |
| 2005/0120266 A1 * | 6/2005 | Cernea ............................. | 714/8 |
| 2005/0131668 A1 * | 6/2005 | Traut .............................. | 703/22 |
| 2005/0172968 A1 | 8/2005 | Sukegawa | |
| 2005/0223144 A1 | 10/2005 | Sukegawa | |
| 2006/0203596 A1 * | 9/2006 | Shiga ....................... | 365/230.03 |
| 2007/0150715 A1 * | 6/2007 | Rothman et al. ................. | 713/1 |
| 2007/0260770 A1 * | 11/2007 | Walsch et al. .................. | 710/27 |

FOREIGN PATENT DOCUMENTS

| | | |
|---|---|---|
| JP | 9-35026 | 2/1997 |
| JP | 2001-266580 | 9/2001 |
| JP | 2002-163225 | 6/2002 |
| JP | 2002-278781 | 9/2002 |
| JP | 2003-256289 | 9/2003 |
| JP | 2004-32913 | 1/2004 |
| JP | 2004-280625 | 10/2004 |

OTHER PUBLICATIONS

Office Action issued Jun. 7, 2011, in Japanese Patent Application No. 2006-206615 (with English Translation).

Japanese Office Action issued Nov. 22, 2011, in Patent Application No. 2006-206615 (with English-language translation).

* cited by examiner

*Primary Examiner* — Edward Dudek, Jr.
*Assistant Examiner* — Ryan Dare
(74) *Attorney, Agent, or Firm* — Oblon, Spivak, McClelland, Maier & Neustadt, L.L.P.

(57) ABSTRACT

A memory device comprises a controller having an interface and an MPU, and configured to enable transferring a device driver for a second access mode via the interface in a first access mode, the second access mode differently defined from the first access mode, and a semiconductor memory with the device driver stored thereon.

19 Claims, 11 Drawing Sheets

| Interface | Pin No. | Signal |
|---|---|---|
| NAND I/F | I/O1~I/O8 | Address data command |
| | −CE | Chip enable signal |
| | −WE | Write enable signal |
| | −RE | Read enable signal |
| | −CLE | Command latch enable signal |
| | ALE | Address latch enable signal |
| | WP | Write protect signal |
| | RY/−BY | Ready/busy signal |
| | GND | Ground input |
| | Vcc | Power source voltage |
| | Vss | Ground voltage |
| | NC | No use |

MEMORY DEVICE, ITS ACCESS METHOD, AND MEMORY SYSTEM

CROSS-REFERENCE TO RELATED APPLICATIONS

This application is based upon and claims the benefit of priority from prior Japanese Patent Application No. 2006-206615, filed Jul. 28, 2006, the entire contents of which are incorporated herein by reference.

BACKGROUND OF THE INVENTION

1. Field of the Invention

The present invention relates to a memory device, its access method, and a memory system. The invention is applied to a memory device, etc., on which, for example, a NAND type flash memory is mounted as the memory device.

2. Description of the Related Art

Conventionally, when a host device attempts to access a memory device having a differently defined access mode (new interface (hereinafter, referred to as I/F) protocol), it cannot access thereto because device drivers to drive access modes are different from each other. In addition, in accessing through the differently defined access mode, the memory device needs to replace the device driver of the host device. Because the device driver is installed in firmware on a read only memory (ROM) of the host device and the ROM is impossible to be rewritten.

In contrast, the replacement of the firmware in the host device also requires to replace, for instance, an I/F of the memory device such as an NAND type flash memory. Therefore, the host device becomes impossible to access the NAND type flash memory which the host device has accessed until then.

Accordingly, in such case, the host device has to prepare firmware corresponding to two kinds of access modes for the device driver for the NAND type flash memory and the device driver for the differently defined access mode (new I/F protocol). Or, the host device needs to prepare more than two kinds of device drivers and also select any one of the device drivers from a plurality of device drivers depending on the memory device connected to the host device.

As a result, when accessing a memory device having any access mode of differently defined (new I/F protocol), the host device needs to replace the device driver thereof, so that the memory device results in reducing its convenience.

For instance, Jpn. Pat. Appln. KOKAI Publication No. 2001-266580 discloses a system equipped with a memory device of a common interface method.

BRIEF SUMMARY OF THE INVENTION

A memory device according to an aspect of the invention comprises a controller having an interface and an MPU, and configured to enable transferring a device driver for a second access mode via the interface in a first access mode, the second access mode differently defined from the first access mode, and a semiconductor memory with the device driver stored thereon.

An access method for a memory device, according to an aspect of the invention, which is having a controller including an interface and an MPU, and a semiconductor memory with a device driver for a second access mode differently defined from a first access mode stored thereon, comprising: accessing the controller to the outside in the first access mode via the interface; and transferring the device driver via the interface.

A memory system according to an aspect of the invention comprises a host device having a CPU, a host interface, and a ROM to store a first device driver for driving a first access mode, and a memory device having a controller including a memory interface and an MPU and enable transferring a second device driver for a second access mode differently defined from the first access mode in accessing the host device in the first access mode via the memory interface, and a semiconductor memory with the second device driver stored thereon.

DETAILED DESCRIPTION OF THE INVENTION

Embodiments of the invention will be described with reference to the drawings hereinafter. In the description, common components are designated by common reference symbols over the whole drawings.

[First Embodiment]

Figure 1:
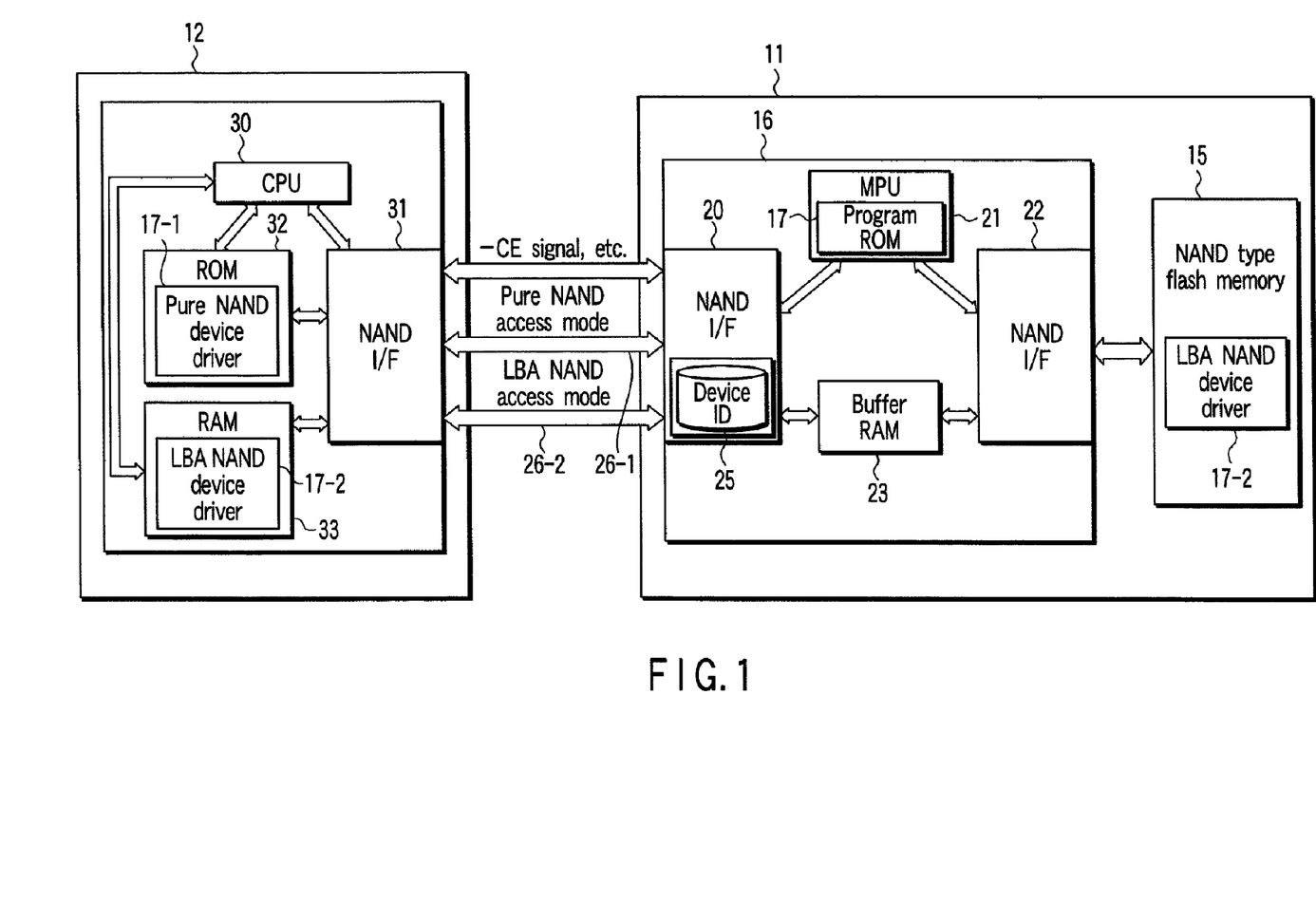
FIG. 1 is an exemplary plan view depicting a memory device regarding a first embodiment of the invention.

A memory device regarding a first embodiment of the present invention will be described while referring to FIG. 1 to FIG. 3. FIG. 1 is a plan view for explaining the memory device relating to the first embodiment. A use environment of a memory device 11 regarding the first embodiment is one of a type in which a host device 12 loads a driver (LBA NAND device driver) 17-2 therefor from a NAND type flash memory 15.

The memory device 11 and the host device 12 are arranged as shown in FIG. 1.

The host device 12 has hardware and software for accessing the memory device 11 to be accessed via a bus (not shown).

The memory device 11 is driven by receiving power supply on being connected to the host device 12 to conduct processing corresponded to access from the host device 12. The memory device 11 performs rear-out/write-in in so-called sector units or in prescribed data size units. Hereinafter, the memory device 11 in the first embodiment will be described as an example in which the memory device 11 is solder-mounted on a printed board like a below-mentioned TSOP package, etc.

The memory device 11 includes a NAND type flash memory 15 that is a memory device and a controller 16 to control the flash memory 15.

The flash memory 15 has stored the LBA NAND device driver 17-2 to drive an LBA NAND access mode (second access mode) 26-2. The LBA NAND access mode 26-2 is an access mode (new I/F protocol) differently defined from a Pure NAND access mode (first access mode) 26-1 to access (connect) the flash memory 15.

As mentioned later, the LBA NAND access mode (hereinafter, referred to as LBA NAND mode) 26-2 uses the same signal pins as those of the Pure NAND access mode (hereinafter, referred to as Pure NAND mode) 26-1, and a command sequence of the LBA NAND mode 26-2 makes communications via the same NAND I/Fs 20 and 31 according to the Pure NAND mode 26-1. In this case, the command sequence means a series of order (input timing) through which commands, addresses and data are input.

As mentioned above, definitions of addresses in the LBA NAND mode 26-2 are different from those of the Pure NAND mode 26-1. That is, as compared that the Pure NAND mode 26-1 accesses by using physical addresses (such as column addresses and page addresses), the LBA NAND mode 26-2 differs in the definitions of the addresses in respect of being accessed with the use of logical sector addresses. In conducting read-out operations in the Pure NAND mode 26-1, the memory device 11 may read out the data preset in the prescribed order without referring to the addresses issued from the host device 12.

The LBA NAND mode 26-2 is an access mode of error free (error-correcting code (ECC)-corrected data is output) which receives accesses in logical sector access hierarchies and does not need to be conscious of sizes of erased blocks.

Figure 2:
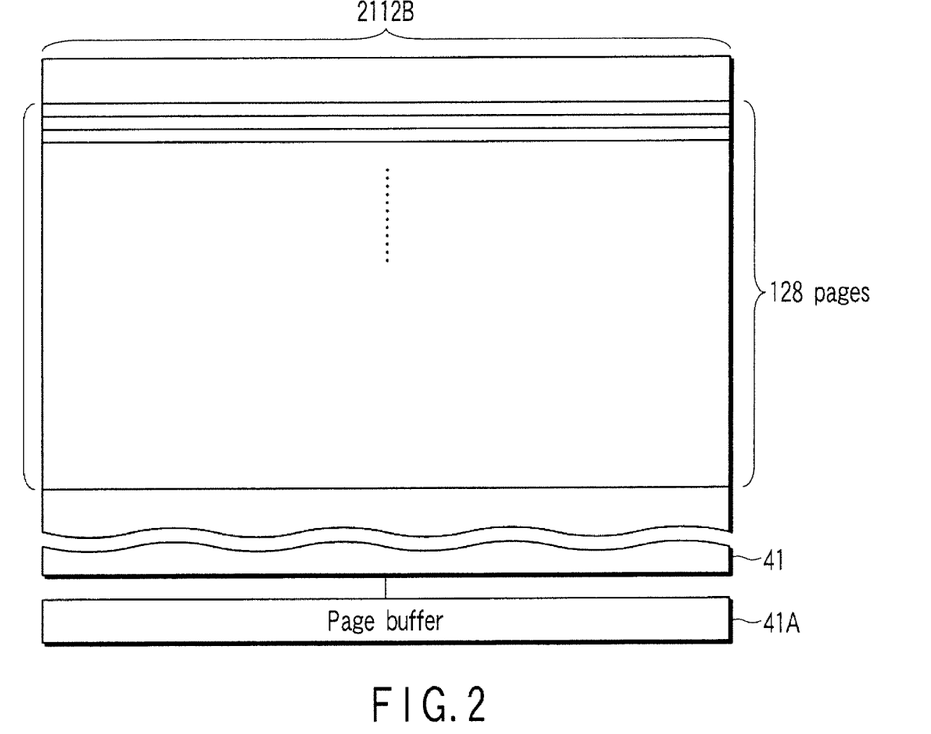
FIG. 2 is an exemplary plan view depicting a data arrangement of a NAND type flash memory.

FIG. 2 illustrates a data arrangement in the NAND type flash memory 15. As illustrated in FIG. 2, each page of the flash memory 15 has a 2,112 B (data memory part of 2 k byte+redundancy part of 64 byte (wherein, k represents 1,024)+managed data memory part of 24B), for example, 128-page represents one erasure unit (256 kB+8 kB, wherein, k represents 1,024). In the following descriptions, as a matter of convenience, the erasure unit of the flash memory 15 is set to 256 kB.

The flash memory 15 has a page buffer 41A to perform a data input and output to and from the flash memory 15. The memory capacity of the page buffer 41A is 2,112 B (2,048 B+64 B). In writing in the data, etc., the page buffer 41A executes the data input and output to the flash memory 15 in units by one page equivalent to its own memory capacity.

If the memory capacity of the flash memory 15 is, for instance, 1 G bits, the number of 256 kB-blocks (erasure unit) becomes 512 pieces.

In FIG. 2, the erasure unit of 256 kB-blocks being exemplified, it is practically effective to establish the erasure unit to become, for example, 16 kB-blocks. In this case, each page has 528 B (data storage part of 512 B+redundancy part of 16 B), and 32-page is one erasure unit (16 kB+0.5 kB).

The controller 16 manages a physical condition inside the flash memory 15 (for instance, what number logical sector address data is included in which physical block address, or which block is erasure condition). The controller 16 has NAND type flash memory interfaces (hereinafter, referred to as NAND I/F) 20 and 22, a micro processing unit (MPU) 21, and a buffer random access memory (RAM) 23.

The MPU 21 is provided with a program read only memory (ROM) 17, and configured to control operations of the whole of the memory device 11. For example, when the memory device 11 receives the power supply, the MPU 21 reads out the firmware (control program) stored on the flash memory 15 onto the buffer RAM 23 to execute prescribed processing, then, it creates various kinds of tables on the buffer RAM 23. The MPU 21 is configured to receive a write-in command, read-in command and erasure command from the host device 12, execute prescribed processing to the flash memory 15, and control data transfer processing through the buffer RAM 23.

The program ROM 17 has stored a program (not shown) so that the memory device 11 operates in the LBA NAND mode 26-2. The program ROM 17 is provided so that the MPU 21 receives the commands transmitted from the host device 12 to send predetermined responses.

The buffer RAM 23 is configured, for instance, in writing the data transmitted from the host device 12 to the flash memory 15, so as to temporarily store a fixed amount of data (for example, of one page), and in transmitting the data read-out from the flash memory 15, so as to temporarily store the fixed amount of the data.

A device identification (ID) 25 is set to the NAND I/F 20. The device ID 25 is data to be output from the memory device 11 through a prescribed protocol in order to identify the memory device 11 is an already known device by the host device 12 when the host device 12 accesses the memory device 11 in the below-mentioned access mode transition operations. Furthermore, the device ID 25 can determine such as a device capacity, erasure block size and page length of the memory device 11. It is not always necessary for the capacity, erasure block size, page length, etc. of the memory device 11 which can be determined by means of the device ID to be equal to the capacity, erasure block size, page length, etc. of the flash memory 15 mounted on the memory device 11.

The host device 12 includes a CPU 30, a NAND I/F 31, a ROM 32 and a RAM 33.

The CPU 30 is configured in order to control the operations of the whole of the host device 12. The CPU 30, for instance, operates so as to execute prescribed processing for predetermined commands received from the memory device 12.

The ROM 32 has stored Pure NAND device driver 17-1 to drive the Pure NAND mode 26-1. Therefore, reading out the device ID 25 though the host device 12 enables the host device 12 to access the memory device 11 in the Pure NAND mode (first access mode) 26-1 as an already known access mode.

The RAM 33 has stored the LBA NAND device driver 17-2 for driving the LBA NAND mode 26-2. The LBA NAND device driver 17-2 is loaded from the memory device 11 through the below-mentioned access mode transition operations to be installed in the RAM 33.

The host device 12 accesses the memory device 11 via the NAND I/F 31 to conduct operations such as writing and reading.

The signals exchanged between the memory device 11 and the host device 12 are described as follows.

An I/O signal includes signals of an address, data and prescribed command.

A command latch enable (CLE) signal is a signal to control taking in an operation command to the inside of the memory device 11, and data on I/O terminals is taken in as a command into a command register by achieving the CLE signal at an H level at a rising edge and a down edge of a write enable (WE) signal.

An address latch enable (ALE) signal is a signal to control taking in address data to an address register inside the device, and the data on the I/O terminals is taken in as address data into the corresponding register by achieving the ALE signal at the H level at the rising edge and the down edge of the WE signal.

A chip enable (-CE) signal is a device selecting signal, and becomes a standby mode for low power by achieving the -CE signal at an H level in a Ready condition. In a Busy condition during operations of a program, erasure and read (RY/-BY="L"), both conditions of "H" and "L" are acceptable.

A write enable (-WE) signal is a signal to take in each data from the I/O terminals to the inside of the device.

A read enable (-RE) signal is a signal to output the data serially from the I/O terminals.

A write protect (WP) signal is a signal to forcibly prohibit writing and erasing operations, and operations of an inside high-voltage generation circuit is reset at WP="L". The WP signal is a signal used at WP="H", but it is used to control to a condition of WP="L" and protect stored data from unexpected operations when an input signal is indeterminate as like in shutting off power supply, or the like.

A ready/busy (RY/-BY) signal is an output signal to notify the inside operation condition of the memory device 11. In programming, erasing and reading, during an internal execution, the memory device 11 outputs the busy signal (RY/BY="L"), and when completing the output, the memory device 11 automatically outputs the ready signal (RY/BY="H").

Figure 3:
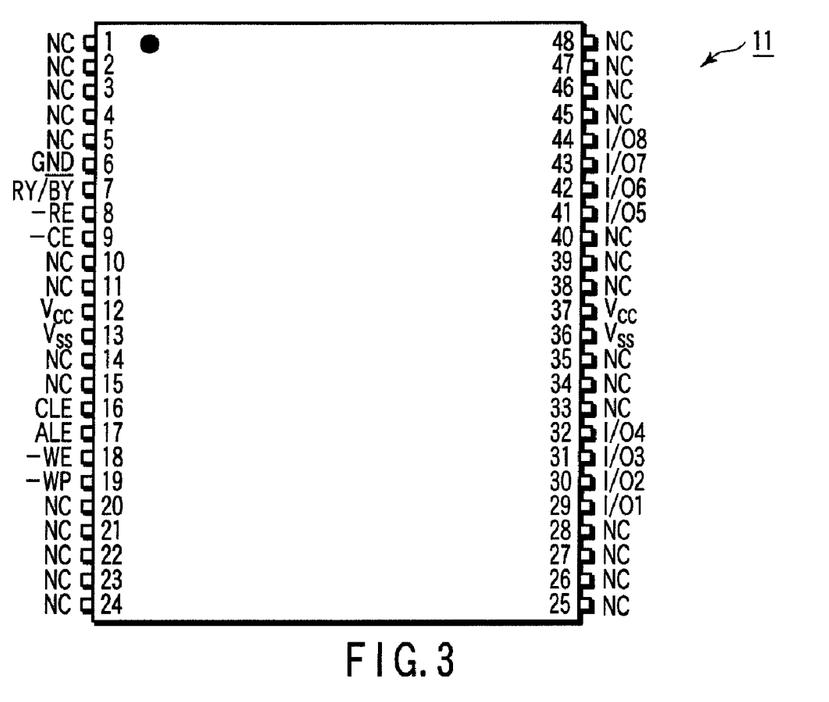
FIG. 3 is an exemplary plan view depicting a memory device in FIG. 1 sealed in a semiconductor package.
Figure 4:
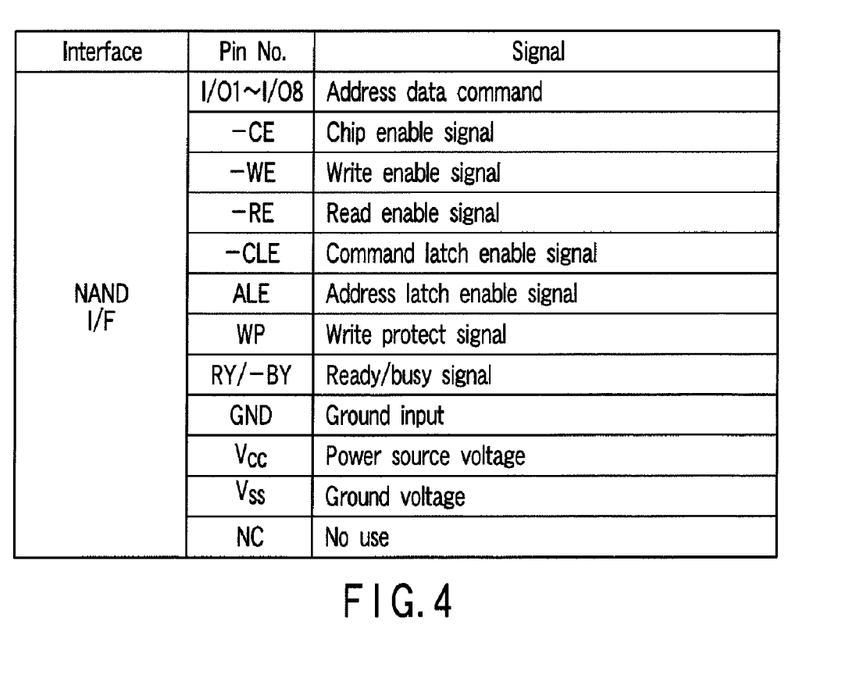
FIG. 4 is an exemplary view depicting names of pins of the semiconductor package shown in FIG. 3.

The memory device 11 may be used by sealing it in a package (thin small outline package (TSOP) package) as shown in FIG. 3. FIG. 4 is a view illustrating the names of the pins to which each signal mentioned above is input. Wherein, a signal pin NC in FIG. 4 is a signal pin for no use.

<Access Mode Transition Operation>

Figure 5:
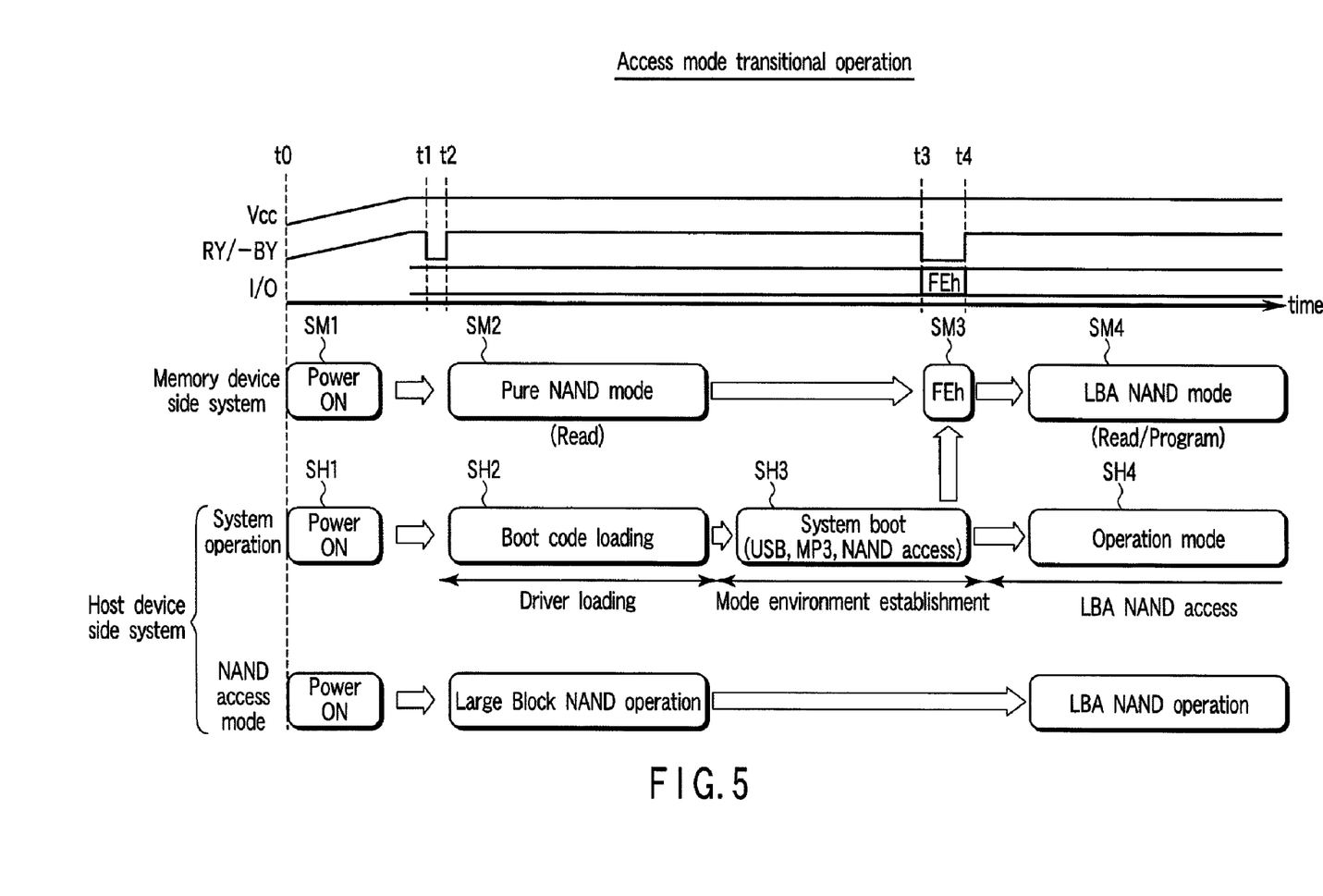
FIG. 5 is an exemplary timing chart depicting access mode transition operations of the memory device regarding the first embodiment.
Figure 6:
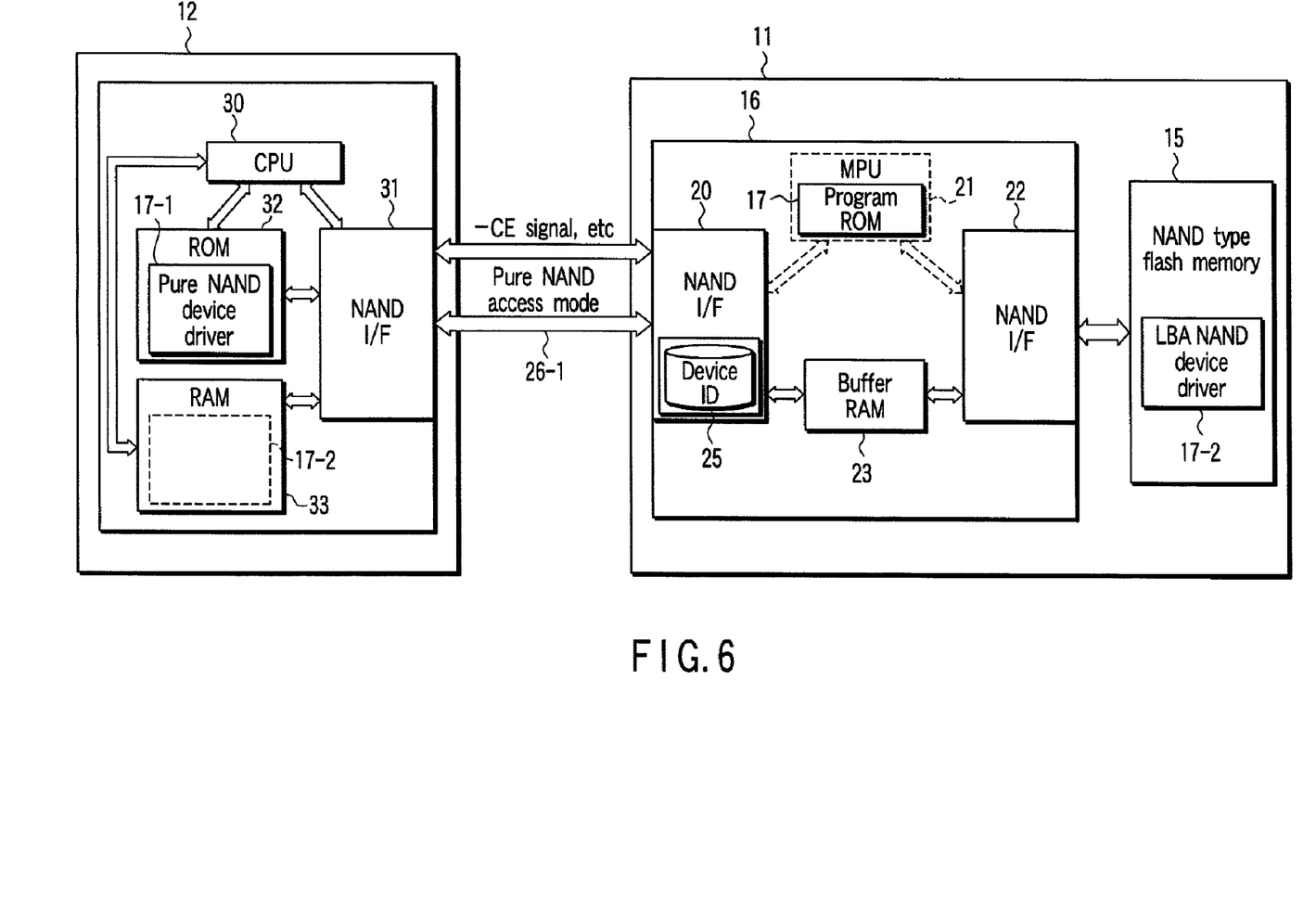
FIG. 6 is an exemplary plan view depicting the access mode transition operations of the memory device regarding the first embodiment.

Next, access mode transition operations of the memory device regarding the first embodiment will be described while using FIG. 5 to FIG. 11. FIG. 5 is a timing chart for explaining the access mode transition operations regarding the first embodiment. FIG. 6 is a plan view illustrating the memory device 11 and the host device 12 before the access mode transition operations. The transition operations will be described in line with the timing chart in FIG. 5 hereinafter.

At first, as shown in FIG. 6, before a time t0 (before turning on power source), the LBA NAND device driver 17-2 has not stored in the RAM 33 of the host device 12 yet.

(Steps SM1 and SH1)

Next to this, at a time t1, on turning on the power of the host device 12, the memory device 11 starts in accordance with a pour source voltage Vcc supplied from the host device 12.

(Steps SM2 (Pure NAND Mode)).

Subsequently, at a time t2, the memory device 11 outputs the device ID 25 possible to be accessed in the Pure NAND mode 26-1 (first access mode) known by the host device 11 to the memory device 11.

Figure 7:
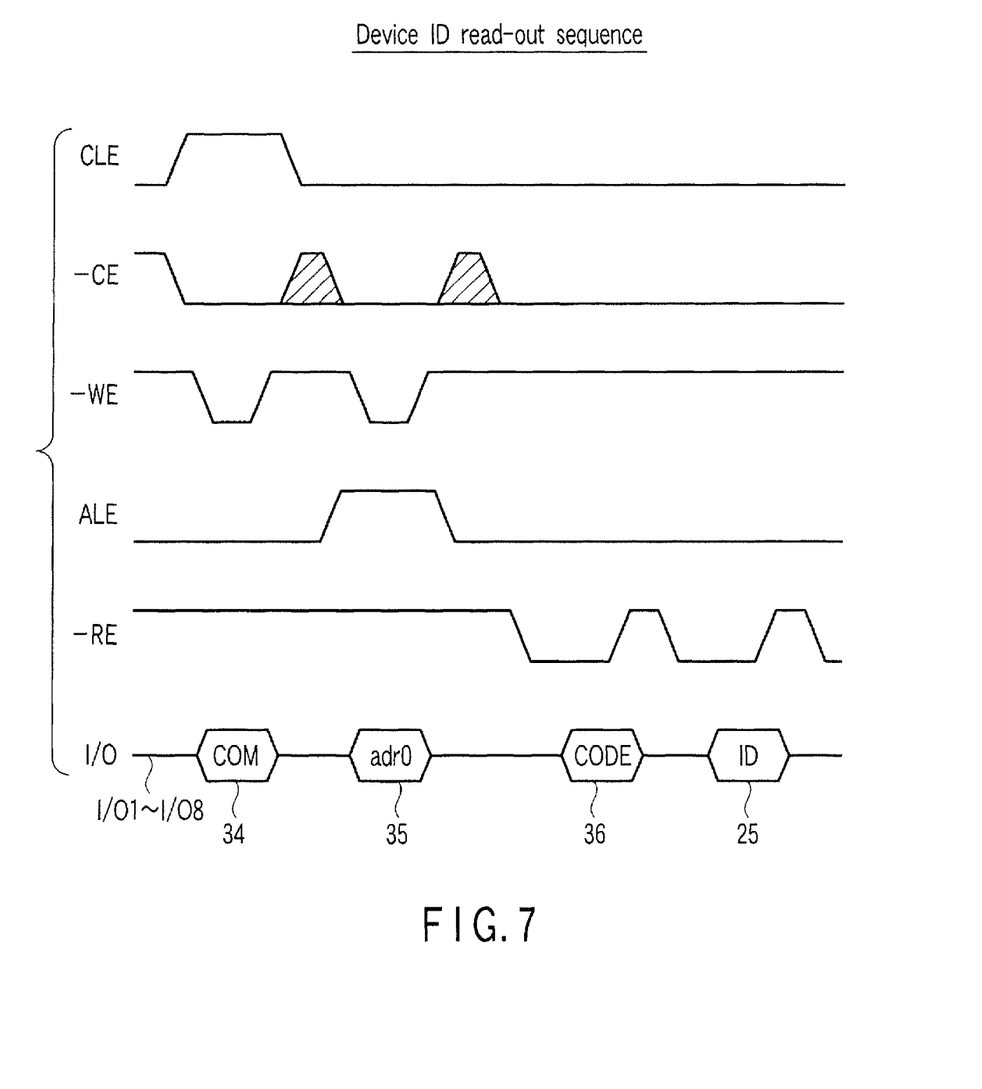
FIG. 7 is an exemplary timing chart depicting an ID read-out sequence regarding the first embodiment.

At this moment, the read-out sequence of the device ID 25 relating to the first embodiment is expressed as shown in FIG. 7.

The memory device 11 firstly takes in an ID read command COM 34 transmitted from the host device 12 through signal pins I/O 1-I/O 8 at the raising edge of the write enable signal -WE, when the command latch enable signal CLE is "High (hereinafter, referred to as H)", the chip enable signal -CE is "Low (hereinafter, referred to as L)", the address latch enable signal ALE is "L", and the read enable signal -RE is "H".

Next, the memory device 11 takes in an address adr 0 35 from signal pins I/O 1-I/O 8 at the raising edge of the write enable signal -WE when the command latch enable signal CLE is "L", the chip enable signal -CE is "L", the address latch enable signal ALE is "H", and the read enable signal -RE is "H".

Next to this, the host device 12 takes in a code 36 from the signal pins I/O 1-I/O 8 at the raising edge of the read enable signal -RE when the command latch enable signal CLE is "L", the chip enable signal -CE is "L", the address latch enable signal ALE is "L", and the read enable signal -RE is "H". From this moment, the host device 12 starts a real read-out operation.

Subsequently, the host device 12 takes in the device ID 25 from signal pins I/O 1-I/O 8 at the raising edge of the read enable signal -RE when the command latch enable signal CLE is "L", the chip enable signal -CE is "L", the address latch enable signal ALE is "L", and the write enable signal -WE is "H".

Therefore, after this, the host device 12 can conducts read-out operations (Read) in the Pure NAND mode 26-1 driven by the device driver 17-1. At this moment, as shown in FIG. 6, in the first embodiment, the host device 12 performs the read-out operations without passing through the MPU 21.

Figure 9:
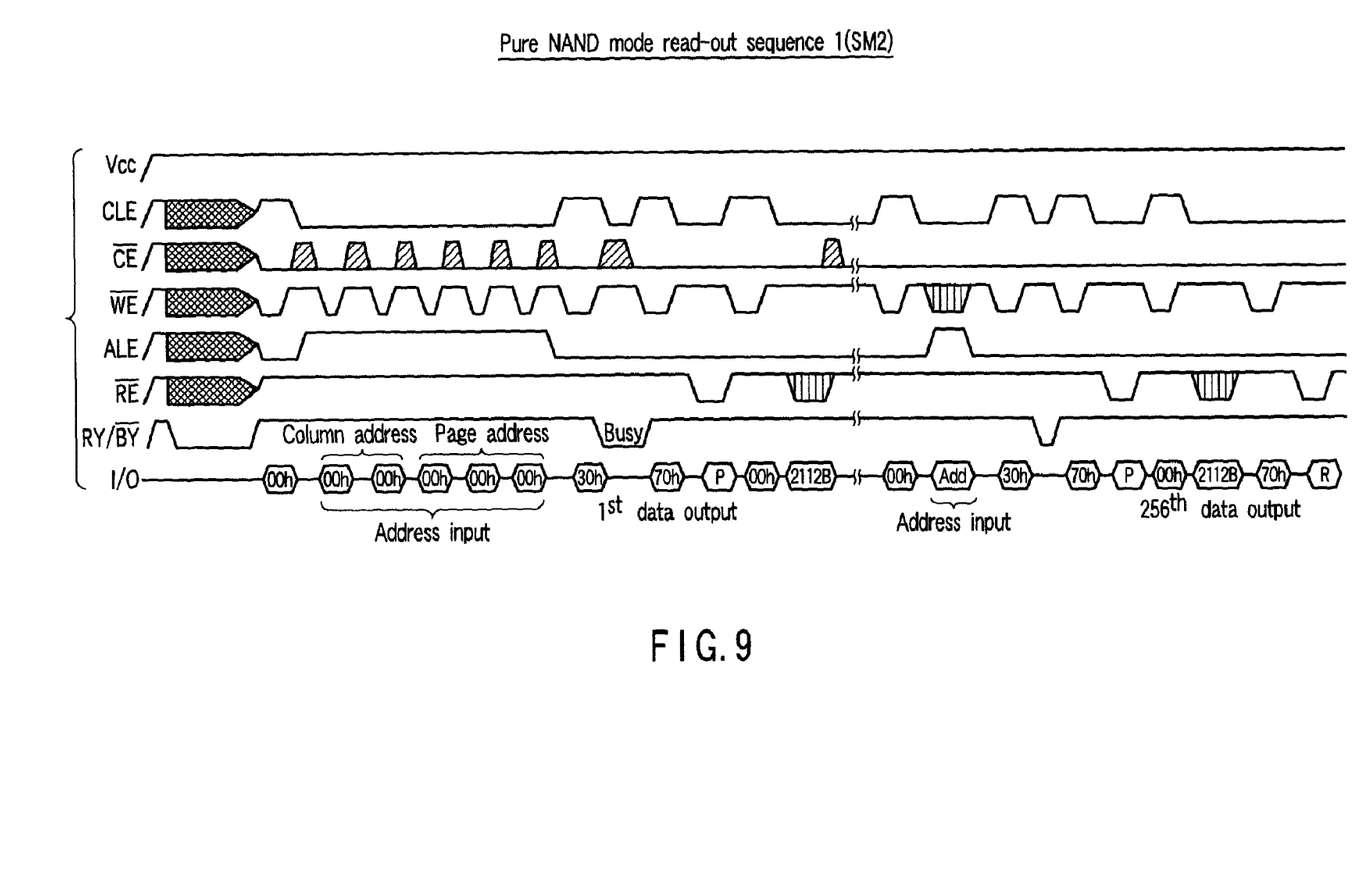
FIG. 9 is an exemplary timing chart depicting a read-out sequence 1 in a Pure NAND mode of the memory device regarding the first embodiment.
Figure 10:
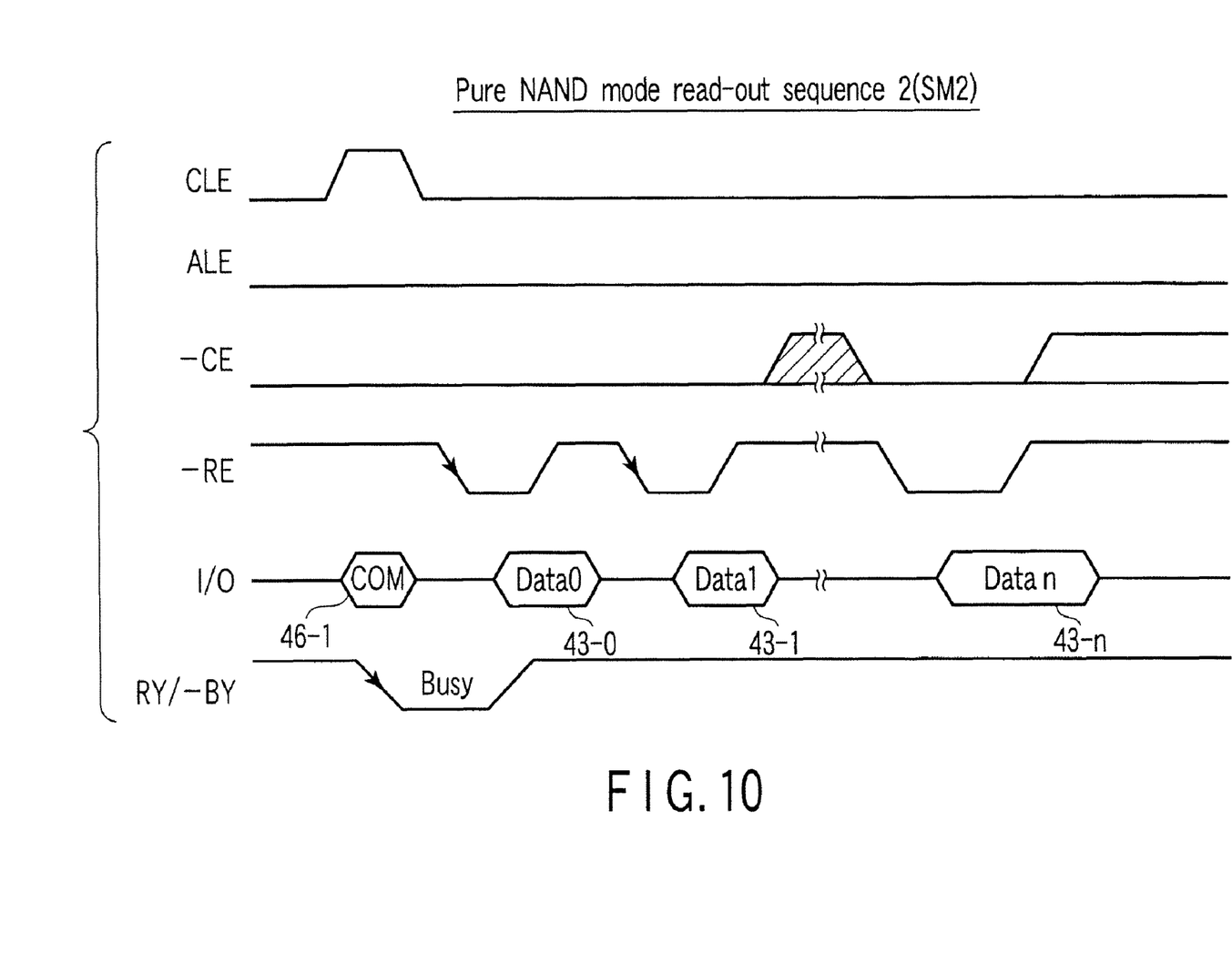
FIG. 10 is an exemplary timing chart depicting a read-out sequence 2 in the Pure NAND mode of the memory device regarding the first embodiment.

In this case, one read-out sequences in the Pure NAND mode 26-1 is expressed, for example, as the following FIG. 9 and FIG. 10.

<Read-Out Sequence 1 (FIG. 9)>

The read-out sequence 1 is, as shown in FIG. 9, a sequence in which column addresses and page addresses are input between commands 00h and 30h. As for the column address and the page address, for instance, 0000h and 000000h are described.

That is, the memory device 11 takes in the command 00h to the controller 16 transmitted from the host device 12 through the signal pins I/O 1-I/O 8 at the raising edge of the write enable signal -WE when the command latch enable signal CLE is "H", the chip enable signal -CE is "L", and the address latch enable signal ALE is "L".

Next, the memory device 11 takes in the column address 00h and the page address 00h to the controller 16 from the signal pins I/O 1-I/O 8 at the raising edge of the write enable signal -WE when the command latch enable signal CLE is "L", the chip enable signal -CE is "L", and the address latch enable signal ALE is "H".

Next to this, the memory device 11 takes in an end command 30h to the controller 16 transmitted from the host device 12 through the signal pins I/O 1-I/O 8 at the raising edge of the write enable signal -WE when the command latch enable signal CLE is "H", the chip enable signal -CE is "L", and the address latch enable signal ALE is "L".

Hereinafter, after the busy signal -BY returns to the ready RY condition, the memory device 11 synchronizes with the raising edge of the read enable signal -RE to read out the data by clocking the read enable signal -RE.

<Read-Out Sequence 2 (FIG. 10)>

The read-out sequence 2 includes, as shown in FIG. 10, only the command 00h and the command 30h (read command 46-1), and it omits inputs of the addresses. As mentioned above, it is possible for the read-out operations in the Pure NAND mode to be configured so as not to refer the addresses issued from the host device 12 and to read out the preset data in prescribed order. In such case, inputs of the addresses may be omitted. The read-out sequence 2 illustrated in FIG. 10 has omitted the inputs of the addresses.

That is, the memory device 11 takes in a read command COM 46-1 (command 00h and command 30h) to the controller 16 transmitted from the host device 12 through the signal pins I/O 1-I/O 8 when the address latch enable signal ALE is "L", the chip enable signal -CE is "L", the read enable signal -RE is "H", and the command latch enable signal CLE is "H".

Subsequently, the host device 12 takes in data (Data 0) 43-0 from the signal pins I/O 1-I/O 8 at the down edge of the read enable signal -RE when the chip enable signal -CE is "L". The memory device 11 then outputs the data 43-0 to the host device 12 at the raising edge of the read enable signal -RE.

Next to this, after the busy signal -BY returns to the ready condition RY, the host device 12 takes in data (Data 1) 43-1 from the signal pins I/O 1-I/O 8 at the down edge of the read enable signal -RE when the chip enable signal -CE is "L". The memory device then outputs the data 43-1 to the host device 12 at the raising edge of the read enable signal -RE.

After this, the read-out sequence 2 repeats the same operations as those mentioned above, and conducts the read-out operations in the Pure NAND mode 26-1.

Here, read-out operations in the Pure NAND mode 26-1 having described in detail, the Pure NAND mode 26-1 is not limited to the forgoing read-out operations and the writ-in and erasing operations may be implemented in a similar manner.

(Step SH2 (LBA NAND Device Driver Transfer))

At the time t2, the host device 12 loads a Boot code (not shown) stored in the ROM 32 to perform the read-out operations, etc.

Further, at this moment, the host device 12 accesses the memory device 11 in the Pure NAND mode 26-1 driven by the device driver 17-1 stored in the memory 32. The host device 12 then stores the LBA NAND device driver 17-2 in its own RAM 32.

Figure 11:
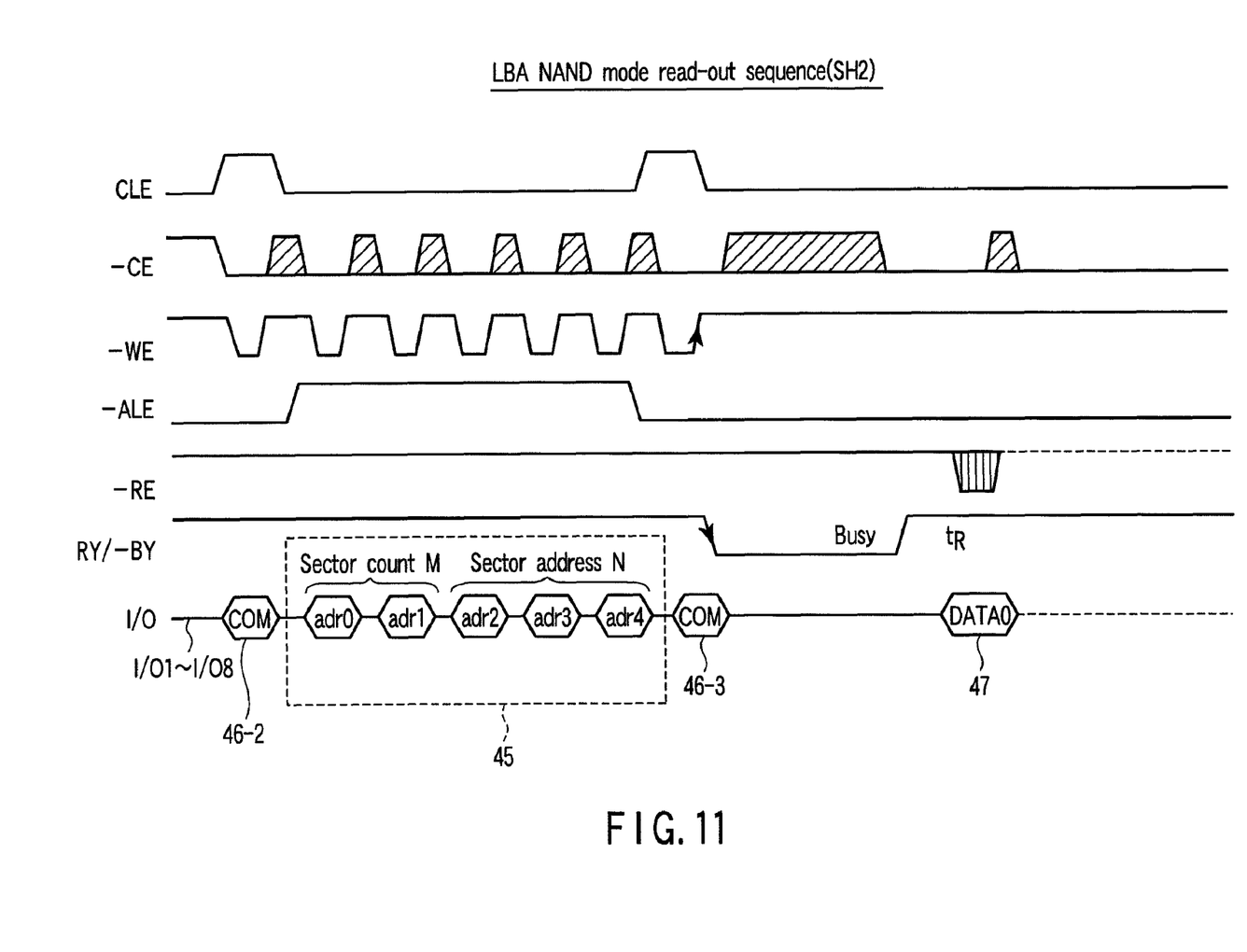
FIG. 11 is an exemplary timing chart depicting a read-out sequence in an LBA NAND mode of the memory device regarding the first embodiment.

Here, the read-out sequence in the LBA NAND mode 26-2 is expressed as shown in FIG. 11.

The memory device 11 firstly takes in a read command COM 46-2 to the controller 16 transmitted from the host device 12 through the signal pins I/O 1-I/O 8 at the raising edge of the write enable signal -WE when the command latch enable signal CLE is "H", the chip enable signal -CE is "L" and the address latch enable signal ALE is "L".

Next, the memory device 11 takes in packets 45 of addresses adr 0-adr 4 to the controller 16 from the signal pins I/O 1-I/O 8 at the down edge of the write enable signal -WE when the command latch enable signal CLE is "L", the chip enable signal -CE is "L" and the address latch enable signal ALE is "H". Among the packets 45, the addresses adr 0-adr 1 configure a sector count M, and the addresses adr 2-adr 4 configure a sector address N.

Like this, this embodiment transfers by defining the address as the sector address N (in the embodiment, address having a minimum unit of almost 512 bytes). In contrast, conventionally, the memory device transfers the addresses by dividing them into almost 5 bytes. The sector count M announces beforehand to transfer haw many sectors will be transferred from now.

Subsequently, the memory device 11 takes in the end command COM 46-3 to the controller 16 transmitted from the host device 12 through the signal pins I/O 1-I/O 8 at the down edge of the write enable signal -WE when the command latch enable signal CLE is "H", the chip enable signal -CE is "L" and the address latch enable signal ALE is "L".

Next, the memory device 11 outputs the ready/busy -RY/-RB signals in the "L" condition (busy condition) during the take in of the packets 45.

Next to this, the memory device 11 transfers a transfer unit 47 composed of a plurality of pieces of data (Data 0, Data 1, etc.) to the host device 12 from the signal pins I/O 1-I/O 8 after a time tR from the down edge of the read enable signal -RE when the chip enable signal -CE is "L", and the ready/busy -RY/-BY signal is "H".

The transfer packet of the transfer unit 47 is transmitted by matching its size with that of the conventional transfer packet (for example, almost 528-byte (512+16) is set as one unit).

Like this, in the present embodiment, even in either access mode of the Pure NAND mode 26-1 or the LBA NAND mode 26-2, the same signal pins I/O 1 etc., shown in FIG. 3 and FIG. 4 are used, and both access modes are in conformity to with electric interfaces (signal line definitions).

For the LBA NAND mode 26-2, only the read-out operations have been described in detail. However, the LBA NAND mode 26-2 is not limited to the aforementioned read-out operations, and the write-in and erasing operations, etc., may be done similarly.

(Step SH3)

Next to this, the host device 12 establishes a system boot environment, and a LBA NAND access mode 26-2 environment loaded beforehand. The system boot environment includes, for example, a universal serial bus (USB) memory system, an MP 3 system, and the like.

(Step SM3)

Next, at a time t3, when the LBA NAND mode environment is completely established, the host device 12 issues a mode change command FEh (h represents hexadecimal notation).

(Step SM4)

Subsequently, at a time t4, when receiving the mode change command FEh, the memory device 11 transits to the LBA NAND mode 26-2. After this, the memory device 11 conducts write-in/read-out (Read/Program) operations, etc., in the transited LBA NAND mode 26-2.

(Step SH4)

At the time t4, the host device 12 transits to the established LBA NAND mode 26-2 to start the operation mode for the read-out operations, etc., in the transited LBA NAND mode 26-2.

(Step SM5)

Figure 8:
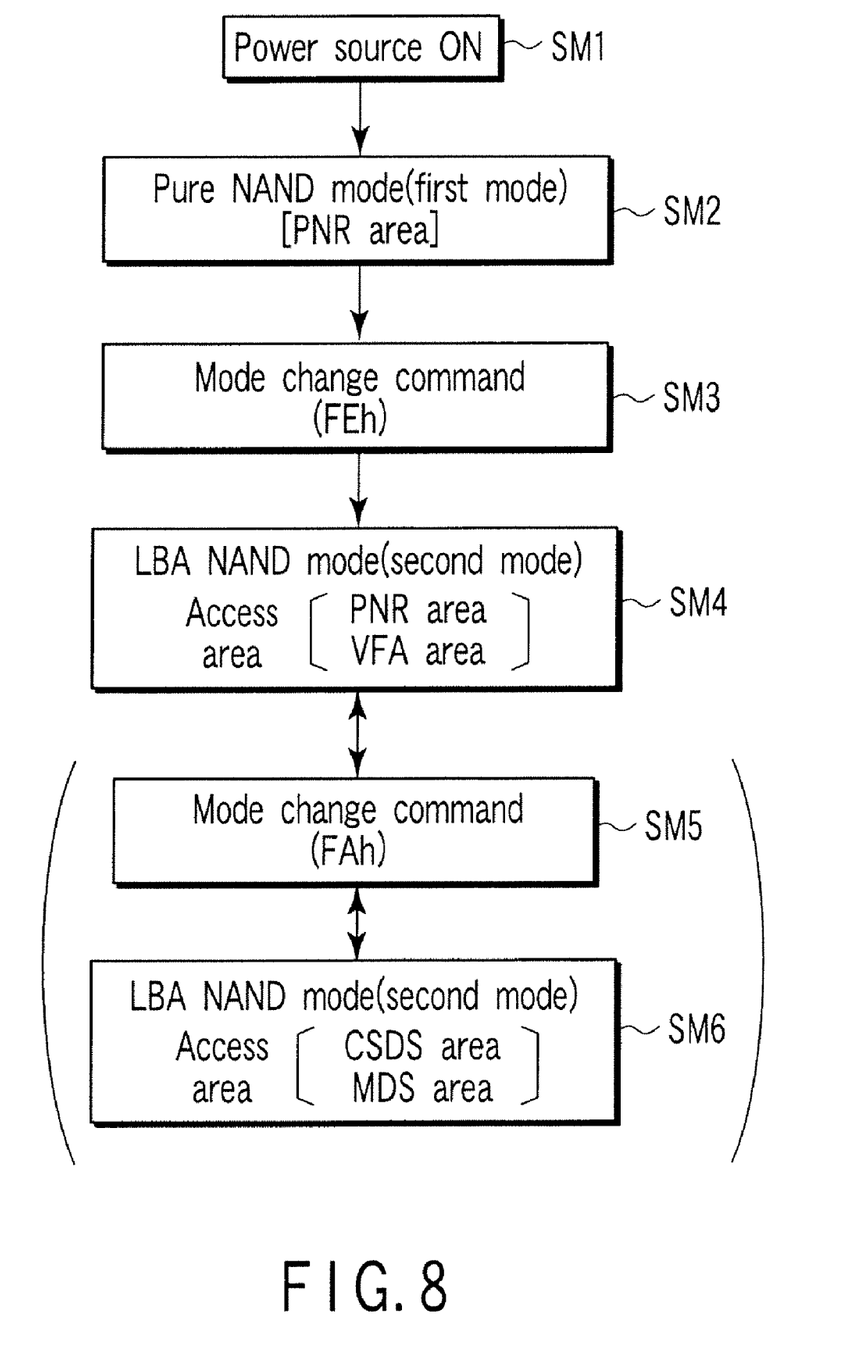
FIG. 8 is an exemplary flowchart for explaining the access mode transition operations of the memory device regarding the first embodiment.

At the later time, as shown in FIG. 8, to change the access area of the memory device 11, the host device 12 issues a mode change command FAh (h represents hexadecimal notation).

(Step SM6)

Subsequently, when receiving the mode change command FAh, the memory device 11 changes the access area from a Pure NAND read (PNR) area and a vender firmware store (VFS) area to a music data store (MDS) area. Changing the access area in this manner enables the memory device 11 to store application data such as music transmitted from the host device 12 in a prescribed area.

In such case, the PNR area includes an area, which is read out by the host device 12 in the Pure NAND mode 26-1 on the basis of the device ID 25, and an area with the LBA NAND device driver 17-2 stored therein. The VFS area is an area to be accessed in the LBA NAND mode 26-2, and an area with the firmware of the host device 12 stored therein. The MDS area is an area which is accessed in the LBA NAND mode 26-2, and an area with the music data stored therein, if the host device 12 is, for example, an audio player.

Further, the access mode transitional operations may be implemented with modifications as follows.

For example, when becoming possible to output data in the Pure NAND mode 26-1 (at the time t2), the memory device 11 seems to be in the Ready condition as a device for the host device 12. At this moment, it is no matter that the memory device 11 has not enabled the data to output in the LBA NAND mode 26-2 yet.

In this case, the memory device 11 conducts initializing processing to enable the data to output in the LBA NAND 26-2 after the time t2. The MPU 21, for instance, creates system data to store it on the buffer RAM 23. Here, as an example of the system data, an address conversion table, etc., may be included. The address conversion table includes a table to convert between the logical addresses and the physical addresses in the flash memory 15.

Modifying like this enables starting a firm loading time for the host device 12 in a short time, and enables reducing the start time. Even if time-out setting until the flash memory 15 starts the access is relatively short, the host device 12 can transit to the LBA NAND mode 26-2.

Here, the host device 12 confirms whether or not the access environment of the Pure NAND mode 26-2 for the memory device 11 has been already established, for example, in a manner as follows.

After implementing the Pure NAND mode 26-1, the host device 12 firstly issues a reset command to the memory device 11. The memory device 11 then can confirms it by waiting until the Busy condition of its command response becomes the Ready condition. Or, the host device 12 can confirm it by setting the reset command for exclusive use of the LBA NAND access mode and by waiting until the Busy condition of its dedicated reset command response becomes the Ready condition.

In the case of Pure NAND mode 26-1, the memory device 11 may execute to read out the data preset in prescribed order regardless of the addresses of the flash memory 15 issued from the host device 12.

When the existing NAND type flash memory (firmware) is applied to the ROM 32 in the host device 12, the memory device 11 may record the access data in the Pure NAND mode 26-1 so as to enable using an update function (page copy function) of the NAND type flash memory. Of course, even when the LBA NAND mode 26-2 is put in use, the memory device 11 may add the update function of the flash memory of the host device 12. In operating update writing of the flash memory of the host device 12, the memory device 11 may store the data in data order so as to be read out it in the prescribed order regardless of the addresses of the flash memory issued from the host device 12.

In the case of the Pure NAND access mode 26-2, the Page lengths of the flash memory have values such as (2 k+64) Bytes. Among of the Page lengths, ECC data, etc. generated from the host device 12 are included sometimes. In this case, after the host device 12 comes to know a generation defining formula of the ECC data, the memory device 11 may generates the ECC data therein, and the memory device 11 may record the ECC data generated from the host device 12 as it is in the NAND type flash memory 15. When the ECC data generated from the host device 12 mentioned above is included, the following three aspects may be taken into account.

A first aspect is the case in which the memory device 11 has known the generation defining formula of the ECC data generated from the host device 12. In this case, in operating the writing of the data, the memory device 11 omits the ECC data received from the host device 12 to store the rest data in the NAND type flash memory 15. In the reading out operations of the data, the memory device 11 generates the ECC data therein to transmit the data including the ECC data to the host device 12.

In the writing operations of the data, the memory device 11 sometimes writes the ECC data received from the host device 12 as it is in the NAND type flash memory.

Further, a second aspect is the case, in which in the wiring operations of the data, the memory device 11 further generates second ECC data for the data including first ECC data received from the host device 12 within the memory device 11, and the memory device 11 writes in the data including the first ECC data and the second ECC data in the NAND type flash memory 15. That is such aspect, in which the memory device 11 records the data by using two pages of the NAND type flash memory 15.

In this case, in general, the memory device 11 having owned a unique ECC definition, if access from the host device 12 side has, for instance, a value of (2 k+64) Bytes and the Page length of the NAND type flash memory 15 mounted on the memory device 11 is (2 k+64) Bytes, etc., the memory device 11 performs write-in operations in the Pure NAND access mode 26-1 through which the memory device 11 records the data from the host device 12 of one-Page into the NAND type flash memory 15 mounted therein by using the two-Page.

As mentioned above, according to the memory device, and its access method and memory system regarding this embodiment, at least the following (1) to (4) effects are obtained.

(1) Convenience can be improved.

As described above, the memory device 11 transmits the device ID 25 and makes the host device 12 recognize that the memory device 11 is an accessible device (known device). Subsequently, the host device 12 accesses the memory device 11 in the Pure NAND mode 26-1 owned thereby (step SM2). Further, the memory device 11 can transfer the LBA NAND device driver 17-2 driving the LBA NAND mode 26-2 via the NAND I/F 20 (step SH2). This is because the same signal pins shown in FIG. 3 and FIG. 4 are used and the electric interface (signal line definition) are compliant with the Pure NAND mode 26-1 and the LBA NAND mode 26-2. After this, the host device 12 stores the LBA NAND device driver 17-2 in its own RAM 33 (step SH3), transits into the LBA NAND mode 26-2, and can start the read-out operations in the LBA NAND mode 26-2 (step SM4).

Therefore, as long as the memory device 11 transmits the device ID 25 and the host device 12 has the Pure NAND mode 26-1, even when the host device 12 attempts to make access by using the LBA NAND mode 26-2 which is differently defined (new I/F protocol), it can access the memory device 11 by means of the differently defined access mode. At this moment, since the memory device 11 can transfer the LBA NAND device driver 17-2 driving the differently defined LBA NAND mode 26-2, the host device 12 has no need to change its own firmware. Like this, the memory device 11 can be accessed in the desired and differently defined access mode and improve the convenience without having to change the firmware of the host device 12.

(2) Optimal device driver 17-2 can be transferred.

In general, the device driver for an optimal combination between a memory device and a host device is determined with the property of the memory device. As mentioned above, the memory device 11 regarding the present embodiment can transfer the device driver 17-2 to be selected by the memory device 11 to the host device 12 (Step SH2). Therefore, the host device 12 can load the optimal device driver 17-2 selected on the basis of the property of the memory device 11.

Like this manner, the memory device 11 is advantageous in terms of a configuration in which an optimum combination of the device drivers 17-2 can be established with the optimum combination between the device drivers 17-2 of the memory device 11 and the host device 12 selected and transferred.

(3) The host device 12 can access even for a not foreseen and differently defined access mode.

Like the first embodiment, even if the host device 12 has been designed in a specification in which the host device 12 has originally assumed only the Pure NAND mode 26-1 as the access mode for the NAND flash memory 15, the aforementioned access mode transitional operation enables mode transition to other access mode (for example, LBA NAND mode 26-2).

Therefore, the host device 12 can access the differently defined access mode unexpected by the host device 12 to actually drive.

(4) The controller 16 can be easily configured.

As described above, in the first embodiment, in conducting the read-out operations in the Pure NAND mode 26-1 (step SM2), the controller 16 is configured to read out the preset data in prescribed order (Data 0, Data 1, etc.) without referring to the addresses issued from the host device 12.

Like this manner, the controller 16 does not read-out the data the order of which is determined in advance by the host device 12 faithfully with so far as reference to the addresses. Therefore, the first embodiment is advantageous in terms of enabling a simple configuration of the controller 16 by reading out the preset data in the prescribed order without referring to the addresses. Even if the write-in operations are conducted in the Pure NAND mode 26-1, the similar effects above mentioned will be obtained as long as the operations are conducted without referring to the addresses.

[Variations]

Furthermore, it is also possible to employ embodiments to which modifications such as a (variation 1) to a (variation 6) are applied if necessary. According to the memory device, its access method, and memory system regarding the following (variation 1) to (variation 6), at least the aforementioned (1) to (4) effects are obtained.

(Version 1) A memory device that is powered by a plurality of access modes, namely, one access mode among them is an access mode for a NAND type flash memory, and although other access modes are based on electric interfaces, they are differently defined access modes.

Figure 12:
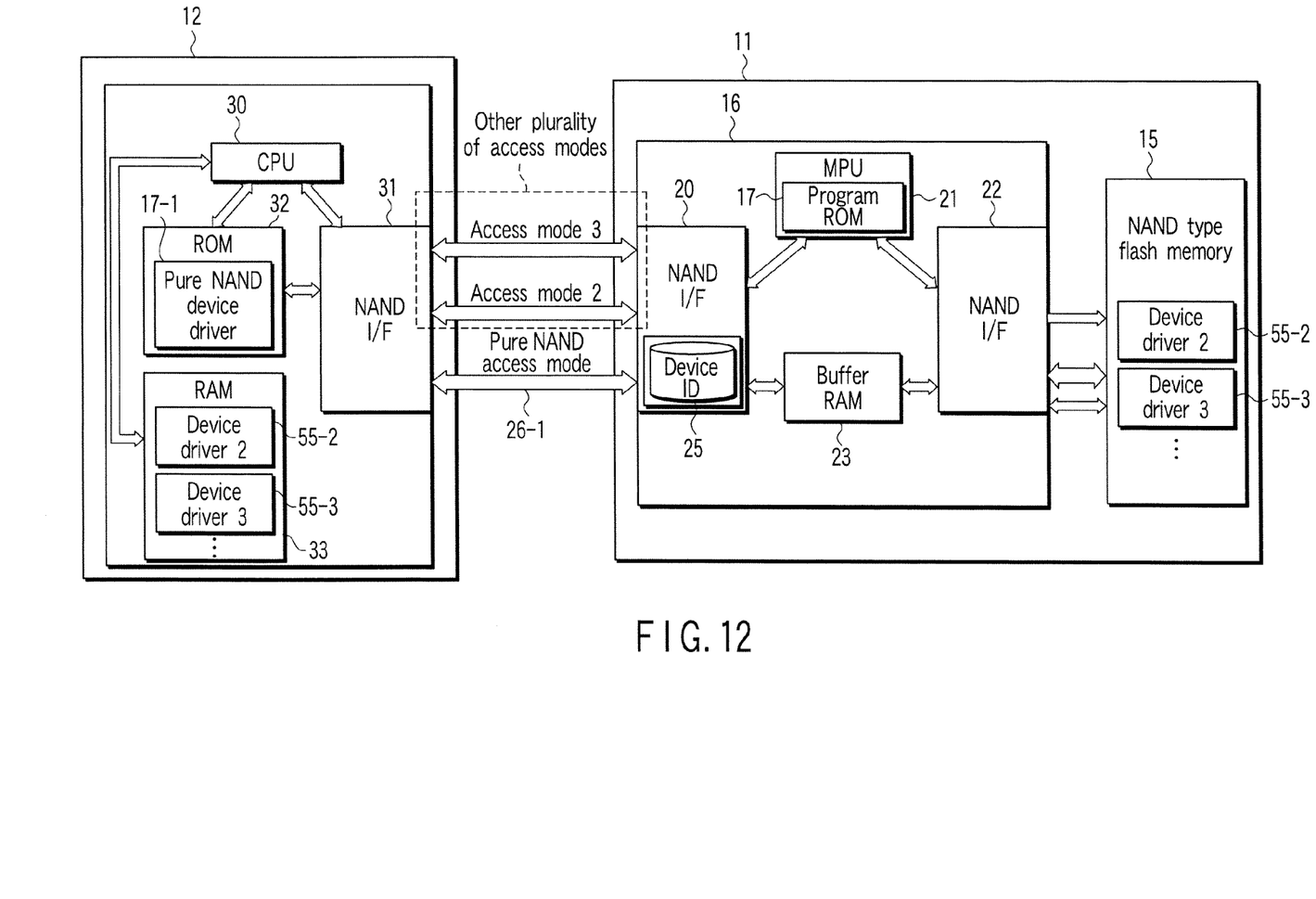
FIG. 12 is an exemplary plan view depicting a memory device regarding a modification example of the invention.

For instance, as shown in FIG. 12, the memory device 11 employing the Pure NAND access mode 26-1, and preparing the Pure NAND access mode 26-1 and other plurality of access modes based on the electric interface is a possible approach. In such case, even when the differently defined access mode (access mode 2, access mode 3, etc.) are applied, the memory device 11 can access the host device 12 without having to change the firmware of the host device 12.

Like such manner, the embodiment having described the access modes by taking the Pure NAND mode 26-1 and LBA NAND mode 26-2 as an example, the access modes are not limited to the example, the version 1 may applicable to a memory device further employing a plurality of access modes. That is, the variation 1 is applicable to a memory device having a first access mode accessing a certain memory device and having other plurality of access modes based on the first access mode and the electric interface.

With the foregoing configuration, the variation 1 is advantageous in terms that the use of other plurality of access modes becomes possible without having to change the hardware of the CPU 30 in the host device 12.

(Variation 2) LBA NAND mode 26-2 is made possible to accept access in a logical sector access hierarchy.

Making the LBA NAND mode 26-2 possible to accept the access in the logical sector access hierarchy poses an advantage in terms of the simplicity of the configuration of the device driver 17-2 driving the LBA NAND access mode 26-2 installed in the firmware of the host device 12.

Further, access becoming possible in a abstracted hierarchy regardless of the property of the memory device mounted on the memory device 11, for instance, there is a merit enabling the same device driver 17-2 to make access in spite of the property of the memory device such as a NAND type flash memory 15.

(Variation 3) LBA NAND mode 26-2 is made possible to accept access in a hierarchy of a file system (name of file).

A modification as mentioned above can make the configuration of the device driver 17-2 driving the LBA NAND mode 26-2 simple. Moreover, because of the same reason as that of the variation 2, the variation 3 has a merit in enabling accessing through the same device driver 17-2 despite the property of the memory device in the memory device 11.

(Variation 4) A memory device provided with a plurality of access modes, one access mode among of them is an access mode of a NAND type flash memory, and other access modes are differently defined access modes, but not based on any electric interface.

Such configuration becomes available through a manner that the memory device 11 newly wires a CPU bus, etc., to access the host device 12 other than the NAND I/F 20. Such configuration is applicable in case of need.

(Variation 5) In performing read-out operations in the Pure NAND mode 26-1 (Step SM2), the memory device 11 reads out/writes in by referring to the addresses issued from the host device 12.

As depicted in FIG. 8, in the first embodiment, in the reading out operations through the Pure NAND mode 26-1 (Step SM2), the memory device 11 does not read out with reference to the addresses issued from the host device 12. However, with read-out by referring to the addresses insured from the host device 12, the memory device 11 can match more faithfully to the access mode of the NAND type flash memory, and it is advantageous in terms of expansion of the compatibility with the host device 12.

Moreover, in conducting the write-in operations, even when the memory device 11 performs the write-in operations with reference to the addresses issued from the host device 12, the same effect is obtained. Because the compatibility with a host device having a wider rage can be achieved together with the write-in property by further faithfully coordinating with the access mode of the NAND type flash memory.

(Variation 6) A data quantity of data 43-0, etc., readable in the Pure NAND mode 26-1 is limited to an extremely small part of the data quantity in the memory device 11.

In many cases, the firmware data quantity requires only an extremely limited memory capacity. Therefore, when only the limited memory capacity is required, with the data quantity of the read out data 43-0, etc., in FIG. 8 limited, the variation 6 is advantageous in terms of the possibility of making the configuration of the memory device 11 simple.

In the aforementioned description, the memory device 11 having described by including a semiconductor package of the TSOP package, etc., as one example, the present invention is not limited to this, for instance, it is applicable to a memory card and the like.

The memory device mounted on the memory device 11 is not limited to the NAND type flash memory shown in the embodiment, other memory devices such as a ferroelectric random access memory (FeRAM) and a magnetic random access memory (MRAM) are similarly applicable.

Further, the embodiment having described by taking the case in which the device driver of the host device 12 is loaded from the memory device of the memory device 11 as one example, the present invention is not limited to such case.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory device, comprising:
   an interface configured to communicate with a host device in a first access mode and a second access mode, the second access mode being differently defined from the first access mode;
   a nonvolatile semiconductor memory configured to store a second device driver to access to the memory device in the second access mode without storing a first device driver to access to the memory device in the first access mode; and
   a controller configured to output the second device driver to the host device via the interface in the first access mode by emulating a device accessible by the first device driver and known to the host device, wherein
   the controller is configured to output data stored in the nonvolatile semiconductor memory via the interface to the host device in the second access mode after outputting the second device driver to the host device, and
   the second access mode converts an externally received first address into a second address and reads the data from the nonvolatile semiconductor memory based on the second address.

2. The device according to claim 1, wherein the first access mode and the second access mode are both based on a same electric interface.

3. The device according to claim 1, wherein the interface outputs, to the host device, a device ID identifying that the memory device is a device known by the host device.

4. The device according to claim 1, wherein the controller includes a micro processing unit (MPU) that has a program ROM to store a program to be operated in the second access mode.

5. The device according to claim 4, wherein the controller outputs the device driver to the host device without activating the MPU in the first access mode.

6. The device according to claim 5, wherein the first access mode uses physical addresses of the nonvolatile semiconductor memory, and the second access mode uses logical sector addresses.

7. The device according to claim 6, wherein the MPU is configured to translate the logical sector addresses to the physical addresses.

8. The device according to claim 1, wherein the nonvolatile semiconductor memory is a NAND type flash memory; and the interface is a NAND interface.

9. The device according to claim 1, wherein the first access mode is a Pure NAND access mode, the second access mode is an LBA NAND access mode, and the device driver is an LBA NAND device driver.

10. The device according to claim 1, wherein the nonvolatile semiconductor memory includes a plurality of blocks, and the block is a data erasure unit.

11. The device according to claim 1, wherein the controller performs error correction for read data and outputs error corrected data to the host device through the interface.

12. A memory system, comprising:
    a host device including a CPU, a host interface, and a ROM to store a first device driver to drive a first access mode; and
    a memory device including
        a memory interface configured to communicate with the host interface in the first access mode and a second access mode differently defined from the first access mode,
        a nonvolatile semiconductor memory configured to store a second device driver to drive the second access mode without storing the first device driver to access to the memory device in the first access mode, and
        a controller configured to output the second device driver to the host device in the first access mode, wherein
    the controller is configured to output data stored in the nonvolatile semiconductor memory via the interface to the host device in the second access mode after outputting the second device driver to the host device, and
    the second access mode converts an externally received first address into a second address and reads the data from the nonvolatile semiconductor memory based on the second address.

13. The system according to claim 12, wherein the host device further comprises a RAM which stores the second device driver.

14. The system according to claim 13, wherein the second device driver is loaded from the memory device to be installed in the RAM of the host device.

15. The system according to claim 12, wherein the memory interface outputs, to the host device, a device ID which identifies that the memory device is a device known by the host device.

16. The system according to claim 12, wherein the nonvolatile semiconductor memory is a NAND type flash memory, and the interface is a NAND interface.

17. The system according to claim 12, wherein the first access mode is a Pure NAND access mode, the second access mode is an LBA NAND access mode, the first device driver is a pure NAND device driver, and the second device driver is an LBA NAND device driver.

18. The system according to claim 12, wherein the nonvolatile semiconductor memory includes a plurality of blocks, and the block is a data erasure unit.

19. The system according to claim 12, wherein the controller performs error correction for read data and outputs error corrected data to the host device through the interface.

* * * * *